United States Patent
Sunderland

(10) Patent No.: US 11,053,405 B2
(45) Date of Patent: Jul. 6, 2021

(54) SUSTAINABLE BIO-CHAR-BASED INK HAVING CONDUCTIVE PROPERTIES

(71) Applicant: Thomas Jefferson University, Philadelphia, PA (US)

(72) Inventor: Mark Sunderland, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 0 days.

(21) Appl. No.: 16/860,008

(22) Filed: Apr. 27, 2020

(65) Prior Publication Data

US 2020/0339832 A1    Oct. 29, 2020

Related U.S. Application Data

(60) Provisional application No. 62/838,966, filed on Apr. 26, 2019.

(51) Int. Cl.
*C09D 11/52* (2014.01)
*C09D 11/033* (2014.01)
*C09D 11/037* (2014.01)

(52) U.S. Cl.
CPC ............ *C09D 11/52* (2013.01); *C09D 11/033* (2013.01); *C09D 11/037* (2013.01)

(58) Field of Classification Search
CPC ..... C09D 11/033; C09D 11/037; C09D 11/52; C09D 101/00; C09D 101/02; C09D 101/108
USPC .................................................. 252/500, 510
See application file for complete search history.

(56) References Cited

U.S. PATENT DOCUMENTS

| | | | |
|---|---|---|---|
| 3,508,871 A * | 4/1970 | Cory .................... | D01F 9/16 423/447.8 |
| 7,852,613 B2 | 12/2010 | Ma et al. | |
| 8,728,432 B2 | 5/2014 | Arai et al. | |
| 9,272,538 B2 | 3/2016 | Livingston | |
| 2002/0117564 A1* | 8/2002 | Hahn ...................... | B02C 13/18 241/1 |
| 2007/0007495 A1 | 1/2007 | Hayes | |
| 2010/0091052 A1 | 4/2010 | Ogawa et al. | |
| 2012/0007913 A1 | 1/2012 | Jang et al. | |
| 2012/0171104 A1* | 7/2012 | Arai ..................... | C09D 11/324 423/415.1 |
| 2014/0267515 A1* | 9/2014 | Zhang .................... | C09D 11/40 347/100 |
| 2017/0058127 A1* | 3/2017 | Naduvile Veettil .... | D21H 11/18 |
| 2017/0098827 A1* | 4/2017 | Kim ...................... | C01B 32/15 |
| 2018/0298220 A1* | 10/2018 | Kramer ................. | C09D 11/037 |

OTHER PUBLICATIONS

Hulse "Biochar as a Substitute for Carbon Black in Lithographic Ink Production." https://scholarworks.rit.edu/theses/10130/, presented on Apr. 24, 2019 (Year: 2019).*

(Continued)

*Primary Examiner* — Tri V Nguyen
(74) *Attorney, Agent, or Firm* — Vos-IP, LLC

(57) ABSTRACT

A process for forming a conductive hemp-based ink comprising carbonizing hemp and reducing the particle size of said hemp via a milling process to between 2 and 5 microns, wherein said reduced size hemp particles are combined with at least one aqueous carrier to produce an ink, and wherein said ink is conductive.

4 Claims, 12 Drawing Sheets

(56) References Cited

OTHER PUBLICATIONS

Nan "The effect of bio-carbon addition on the electrical, mechanical, and thermal properties of polyvinyl alcohol/biochar composites." Journal of Composite Materials 2016, vol. 50(9) 1161-1168 (Year: 2016).*

"International Search Report issued in International Application No. PCT/US2020/030154 dated Jul. 29, 2020", dated Jul. 29, 2020.

* cited by examiner

Wet Milling

3D Carbon @ 15,000×

3D Carbon

"Flat Carbon" Grapheite @ 15,000×

"Flat Carbon" Grapheite

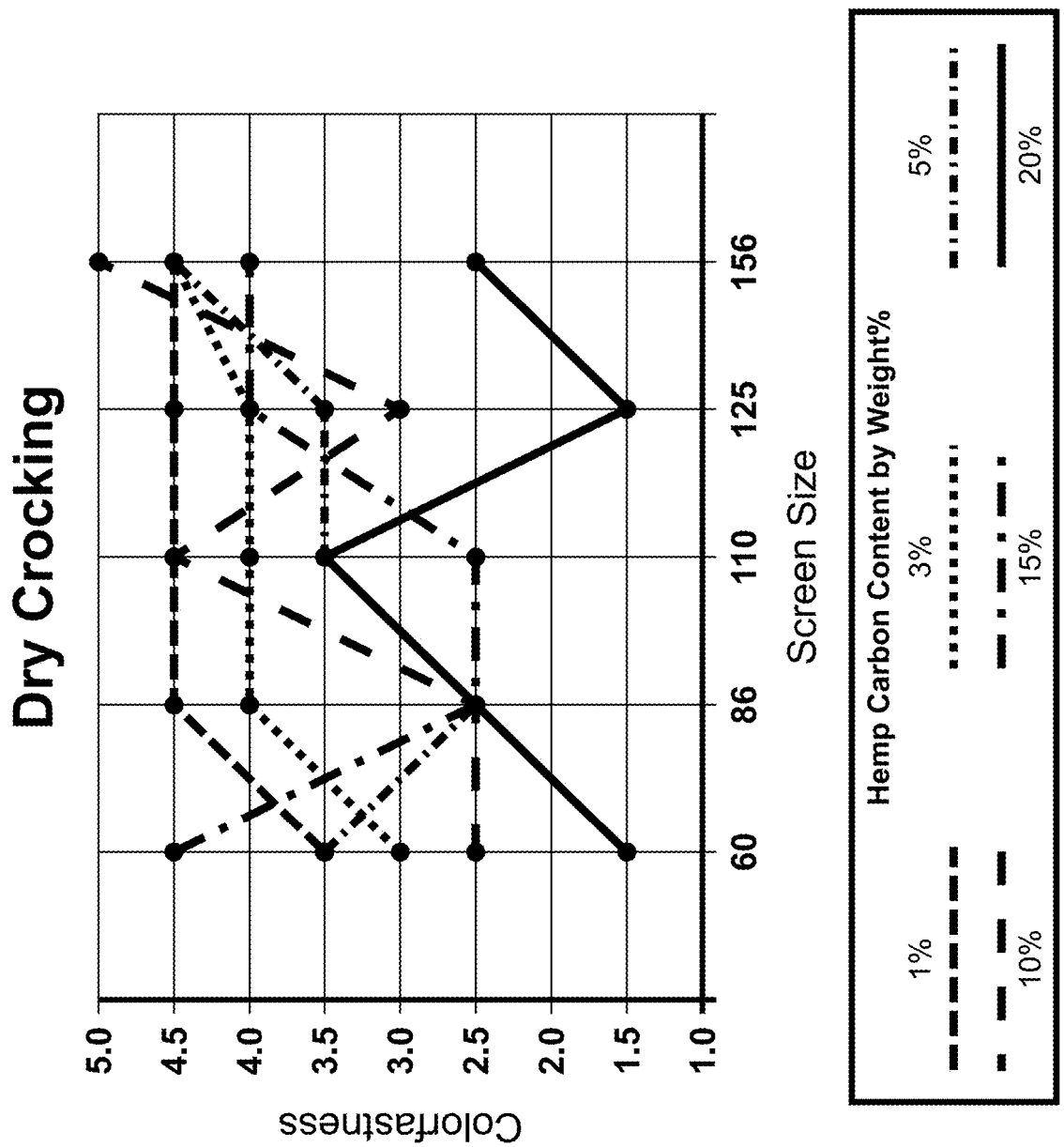

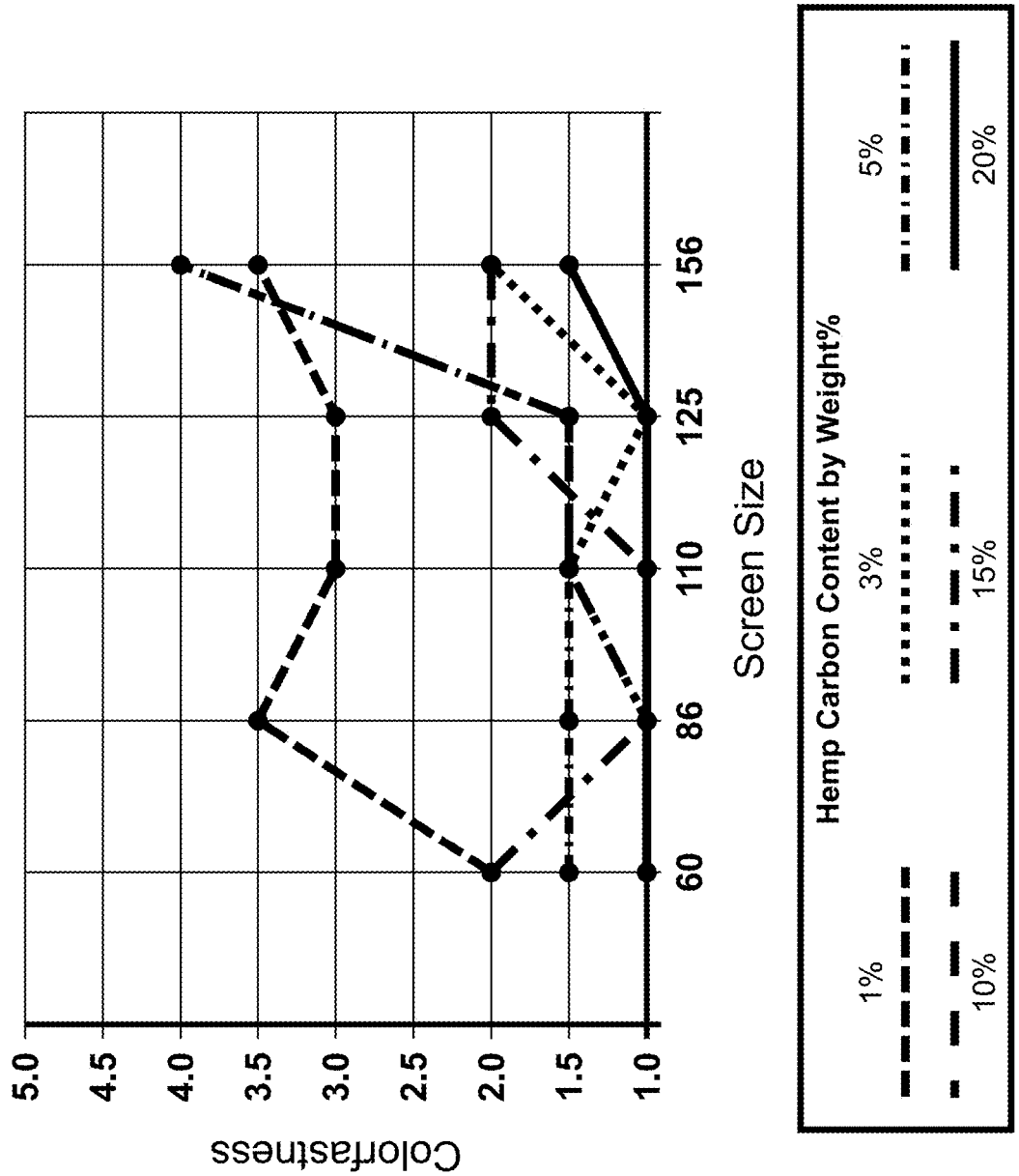

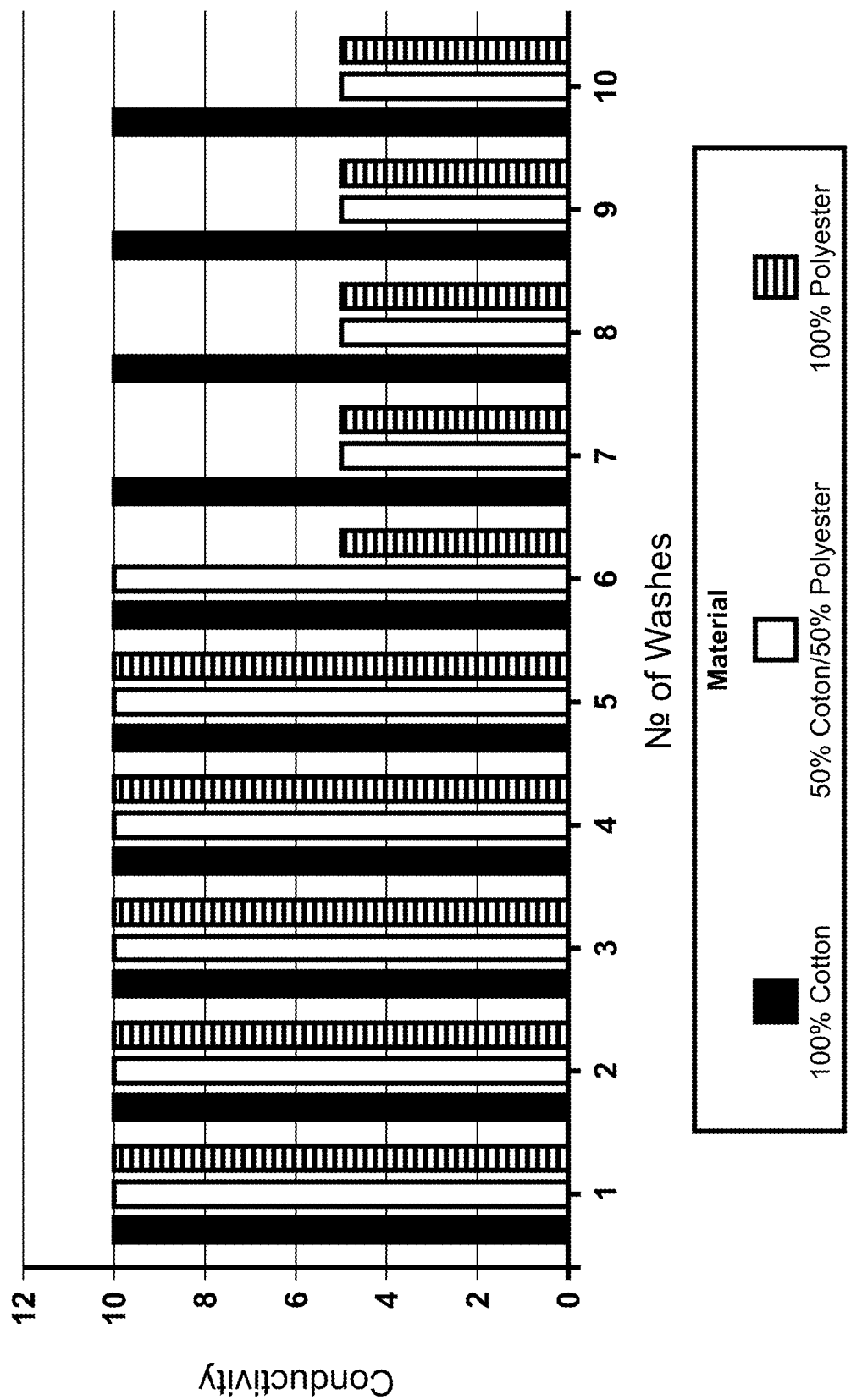

Grid

Mesh

Inverse Mesh

SUSTAINABLE BIO-CHAR-BASED INK HAVING CONDUCTIVE PROPERTIES

CROSS-REFERENCE TO RELATED APPLICATIONS

This application claims the benefit of U.S. Provisional Patent Application No. 62/838,966 filed on Apr. 26, 2019, with the United States Patent and Trademark Office, the contents of which are incorporated herein by reference in their entirety.

FIELD OF THE INVENTION

The present application is generally related to processes and methods for forming sustainable ink materials comprising charred or carbonized hemp particles. The ink may be specifically crafted to have enhanced conductive and capacitance properties or nonconductive properties, depending on the formulation. Furthermore, the materials may serve as a pigment for sustainable ink products.

BACKGROUND OF THE INVENTION

Ink, by its very nature is nearly as old as written language. Historically, ink combines a carrier and a pigment to form a liquid material. Early inks utilized natural materials and pigments were generated from leaves or berries to form a variety of colors. The pigment is admixed with a carrier, applied to a surface, and the carrier evaporates or is absorbed into the surface, leaving the pigment. When the ink dries, the pigment is left on the surface.

Char has also been used to make ink for centuries. Char is typically made by heating a cellulosic material in a low oxygen environment at a temperature of between 600-700° C., with higher temperatures unnecessary for current processing needs. This process typically takes between 12-72 hours, though longer periods are possible, and the process burns off volatile compounds such as water, methane, hydrogen, and tar. In commercial processing, the burning takes place in large concrete or steel silos with very little oxygen, and the burning stops before the material turns to ash. The process yields black lumps and powder, about 25% of the original weight.

Historically, char referred to charcoal, which was used for cooking and heating. The process of making charcoal is ancient, with archaeological evidence of charcoal production going back about 30,000 years. Individuals utilize cellulosic matter, which is burned or charred at low oxygen conditions, to generate charcoal. When ignited, the carbon in charcoal combines with oxygen and forms carbon dioxide, carbon monoxide, water, other gases, and significant quantities of energy. The quantity of energy is the salient feature as charcoal packs more potential energy per ounce than raw wood. Furthermore, charcoal burns steady, hot, and produces less smoke and fewer dangerous vapors than raw wood. Because charcoal burns hotter, cleaner, and more evenly than wood, it was used by smelters for melting iron ore in blast furnaces, and blacksmiths who formed and shaped steel, among other uses.

Interestingly, as wood and other cellulosic materials are carbonized, the material structurally changes into simple carbon structures. This has been historically utilized for its absorptive properties, for example in filtering wastewater as well as binding body toxins. Large amounts of carbon are utilized for these purposes in numerous industries.

Carbon products based on hemp have heretofore been neglected. This neglect is due to numerous reasons including the significant difficulties with the plant's mechanical structure, generation of sticky resin substances on the stalk during retting, its light mass and density, and presence of certain metabolites and cannabinoids, which have generally precluded its use.

The processes and methods described herein advantageously provide new methods and processes to generate micron-sized particles from hemp-based cellulosic materials, which are advantageously utilized to form hemp-based inks.

SUMMARY OF THE INVENTION

A process for generating a hemp char-based ink comprising a carrier and a portion of hemp-based char, wherein said ink is conductive; the process comprising charring hemp stalk at a temperature of at least 1100° C. under low oxygen conditions to create a char; milling said char to create a milled char and adding said char to an aqueous carrier; said aqueous carrier further comprising at least one other solid, and at least one other excipient for stabilizing the hemp char.

In a further embodiment, a method for making a non-petroleum based black ink, said ink comprising an aqueous carrier and a pigment made from charred hemp; said charred hemp made by charring hemp stalk at a temperature of at least 1100° C. under low oxygen conditions to create a char; milling said char to create a milled char to between 2 and 5 microns, and adding said char to said aqueous carrier.

In a further embodiment, the method wherein the milled char is classified with a classification system having at least one gradient of 2 microns in size and a second gradient of 5 microns in size; and capturing the material between about 2 and about 5 microns in size for addition to the hemp-based ink.

In a further embodiment, the method wherein the milled char is between 1 and 19 weight percent of the total weight of the ink.

In a further embodiment, the method wherein the milled char comprises between 1 and 5 weight percent of the ink to function as a pigment and between 14 and 19 weight percent wherein the ink is conductive when screen printed with an 86 to 110 size screen.

In a further preferred embodiment, a method of making a conductive hemp-based ink comprising: carbonizing a portion of hemp in a furnace, said furnace being flushed with nitrogen and then heated from 25° C. to greater than 1100° C., holding the temperature of greater than 1100° C. for at least 60 minutes; maintaining nitrogen flow over the heating and hold times to maintain a low oxygen environment; removing the hemp from the furnace and cooling it to room temperature; milling the cooled hemp to a reduced particle size and classifying the milled hemp, obtaining a fraction from the classified hemp, wherein a 95% of the milled hemp is between 2 and 5 microns in size; combining the classified hemp with an aqueous carrier to form the conductive hemp-based ink.

In a further embodiment, the method wherein the conductive hemp-based ink comprises between 1 and 19 weight percent of the weight of the ink and is printed using a size 60 printing screen.

In a further embodiment, the method wherein the conductive hemp-based ink comprises between 14 and 19 weight percent of the weight of the ink and is printed using an 86 to 110 size printing screen. In a further embodiment, the method wherein the conducive hemp-based ink is washable and retains conductivity after washing.

In a further embodiment, the method wherein 99% of the milled hemp is less than 5 microns in size.

In a further embodiment, the method further comprising adding at least one solvent to the aqueous carrier, wherein the solvent evaporates faster than water.

In a further embodiment, the method wherein the carrier further comprises an excipient selected from the group consisting of: a buffering agent, a resin, humectant, a fungicide, a surfactant, a biocide, a bulking agent, a dispersing polymer, and combinations thereof.

In a further embodiment, the method wherein the milling step is a wet milling process. In a further embodiment, the method wherein the wet milling process comprises addition of a solvent added to a milling chamber with cooled hemp at a ratio of hemp to aqueous solvent from 10:1 to 1:10. In a further embodiment, the method wherein the solvent utilized in the wet milling process is a nonaqueous solvent. In a further embodiment, the method wherein the solvent utilized in the wet milling process is an aqueous solvent.

In a further embodiment, the method wherein the ink further comprises a linear or branched chain alcohol. In a further embodiment, the method wherein the liner or branched chain alcohol is a $C_1$-$C_{10}$ alcohol.

In a further embodiment, a sustainable ink comprising an aqueous carrier and a non-petroleum based carbon pigment made form hemp char; said hemp char produced by charring hemp at at least 1100° C. under nitrogen gas for a period of at least 60 minutes; and wherein said hemp char is milled to yield a milled char; wherein the milled char is classified using a classification system to yield a fraction of classified char between 2 and 5 microns in size; wherein the classified char is added to the carrier at between 1% and 20% of the total weight of the ink.

In a further embodiment, the sustainable ink of claim 18, wherein the ink is conductive when printed with a 60 screen size and at a concentration of at least 1 weight percent.

In a further embodiment, the sustainable ink wherein the ink is suitable for screen printing with a size 60 screen, and wherein the classified char comprises between 1 and 6 weight percent of the weight of the ink, which yields a non-washable conductive ink.

In a further embodiment, the sustainable ink wherein the classified char comprises between 14 and 19 weight percent of the weight of the ink, and wherein the ink is washable upon screen printing with a screen size of between 86 and 110, and remains conductive after washing.

In a further embodiment, an ink comprising a portion of hemp char and at least one carrier; said hemp char produced by charring hemp at least 1100° C. under nitrogen gas for a period of at least 60 minutes; and wherein said hemp char is milled to an average particle size of between 2 and 5 microns via a milling process; wherein the hemp char is added to the carrier at between 1% and 20% of the total weight of the ink and is dispersed into the aqueous vehicle; a dispersing agent or a surfactant; and at least one binding agent.

In a further embodiment, the ink comprising between 1 and 20% hemp char, wherein said ink is screen printed onto a surface and imparting a UPF of at least 20.

In a further embodiment, the ink comprising a hemp-based pigment, said pigment comprising at least 10% less PAH than a petroleum-based carbon of the same concentration.

In a further embodiment, the ink of any of the above methods, wherein the ink is non-toxic.

BRIEF DESCRIPTION OF THE FIGURES

FIG. 5 depicts data regarding dry crocking of test samples using a hemp carbon-based ink.

FIG. 6 depicts data regarding wet crocking of test samples using a hemp carbon-based ink.

FIGS. 8A and 8B depict conductive of ink after laundering with FIG. 8A regarding a 15% hemp carbon sample and FIG. 8B regarding a 20% hemp carbon on three different materials.

DETAILED DESCRIPTION OF THE INVENTION

Figure 1:
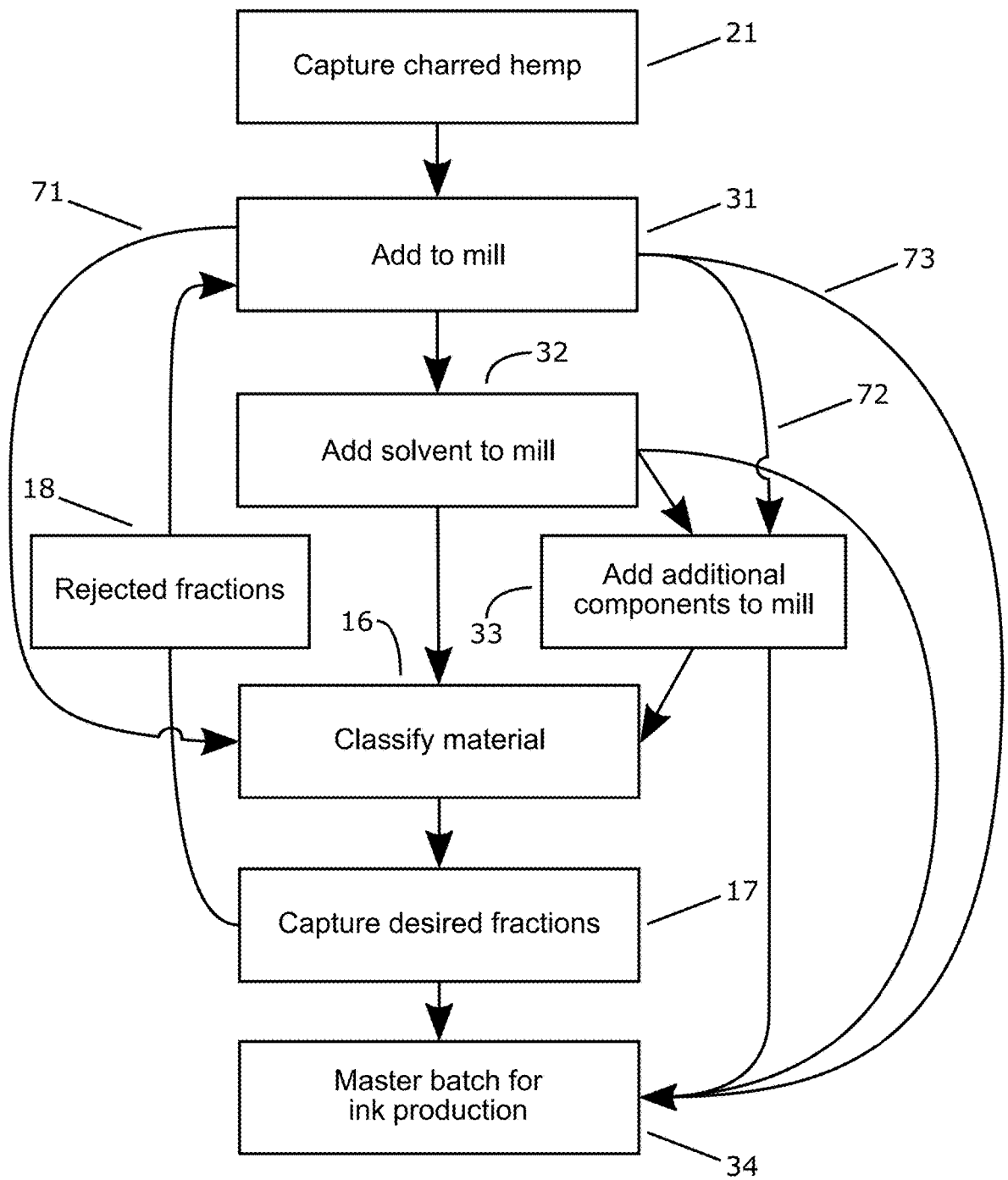
FIG. 1 depicts a flowchart of a milling process for char to form an ink.

Hemp serves as the raw material for a generation of the hemp-based bio-char. Growth of hemp is predicated on simply growing biomass. Hemp has a long history of industrial use and was widely cultivated in the world for its rough use for fibers. Hemp has many advantages over other agricultural crops, namely, the plant itself is resilient to weeds, it can be harvested 2-3 times a year and it does not need pesticides or herbicides to flourish. Its deep root system means that hemp plants need less nitrogen (fertilizer) and water to flourish. Moreover, farmers can use hemp plants as an alternative to clear fields for other crops. The average hemp plant grows to a height of between six (6) feet to sixteen (16) feet and matures in approximately seventy (70) to one hundred ten (110) days, thus facilitating multiple harvest opportunities each year in many areas of the world. A hemp crop has the potential of yielding 3-8 tons of dry stalks per acre per harvest while remaining carbon negative.

The hemp can be taken from any of the various cultivars of the *Cannabis* family, particularly from the *Cannabis Sativa* plant, and biowaste from hemp growth can be utilized. In this manner, we can capture biomass from other industries that are simply interested in processing seeds or leafy greens and utilize both the fibers and hurd. Indeed, herein, processes are described that can utilize both the fibers and hurd in higher value applications than the prior uses. The processes herein describe that it is preferential to utilize both the fiber and the hurd together, in order to generate a superior char material. Heretofore, hemp fibers were typically separated from the hemp hurd, and the fibers used for certain materials and the hurd and remaining biomass utilized in low value applications, such as concrete fillers, animal bedding, and other applications, including simply being composted or burned as waste. However, the combined processing reduces waste and utilizes the fibers and hurd together an a more efficient and valuable process.

Hemp, like many dicotyledonous plants, contains a phloem (hurd) and fibers (bast fibers) around the phloem. The fibers may be separated from the hurd by mechanical action (for example, decortication), or chemical action, and the fibers can then be used for any fiber materials, including textiles like carpet, yarn, rope, netting, matting, and the like. The hurd, by contrast, has previously only been used for rough processes such as papermaking, particleboards, concrete mixtures, and construction composites, as well as for animal bedding. In any given hemp plant, there is significantly more hurd biomass than of fibers. Unfortunately, the use of the hurd has been shunned to date, even though it is the primary biomass of the plant. Manipulation and use of the hurd, therefore, would serve as a critical step in use of this cellulosic product that would otherwise become waste.

The singular use of fibers, however, leads to large amounts of waste byproduct from the stalk or hurd and limits viability of the plant for widespread cultivation. Furthermore, the concern regarding the amounts of tetrahydro cannabinoids (THC) dramatically reduced its use in the Twentieth Century. There are a number of different strains of the hemp plant that contain smaller and larger amounts of the psychoactive compound, THC, and thus cultivation can be optimized for the particular growth and THC content that is desired. Here, low to zero THC, a fast growth rate and a high total biomass is desired. These traits may be naturally derived through strains and crossbreeding as known to those of ordinary skill in the art, or genetically modified.

The relative environmental sustainability of hemp compared to many common agricultural crops, such as cotton, wool, and flax, utilized in the production of fibers for fabrics and industrial materials is well established. As an alternative to wood pulp, hemp grows faster and may be able to be grown in areas that are not hospitable to trees, making it potentially possible to use locally grown hemp in a variety of materials. Furthermore, unlike harvested trees, hemp retains absorbed carbon, rather than releasing it back into the atmosphere. Accordingly, hemp functions as a carbon negative plant, making it highly attractive for large scale use, especially where a downstream use can be identified. These features make hemp an intriguing option for cultivation, but the many difficulties with the plant have precluded its use on any scale up to this point. What is missing from the hemp ecosystem are processes and methods for consumption of the hemp material after its growth, wherein the fibrous materials of the plant can be utilized in commercially viable enterprises.

Therefore, in an effort to pursue sustainable and environmentally responsible bio-char material, suitable for use in a variety of batch processes, and as a replacement for the petroleum based carbons, which are expensive and time/process intensive, such as CNTs and graphenes, applicant has identified micron particle bio-char hemp-based materials and processes for generating the same, in which the bio-char is formed with a carrier into a pigment or a conductive ink. This allows for unique printing opportunities on materials.

Bio-char produced from the pyrolysis of cellulosic agricultural waste results in amorphous carbonized solids that exhibit similar electrical properties of CNTs. Herein, the methods, processes, and products utilize carbonized hemp as the cellulosic material to create a carbon-based ink having particle size of typically less than 5 microns. As used herein, the size "less than 5 microns" or "less than x microns," where x is an integer, means that the size of the particle is less than the stated integer for the major axis of the material. The major axis being the longest length of the particle. So, a particle that is 3.5 microns in length, 1.5 microns wide, and 0.2 microns tall, would be "less than 4 microns in length," as the length of the major axis is 3.5.

In producing carbonized materials, it is impossible to create identical and regular particle shapes, and thus, under microscopic imaging, the particles will vary in shape and size. However, in preferred embodiments the particle size is preferably below 5 microns, and preferably between 2 and 5 microns, which can be sorted using a classification system. Once such material is generated, the micron-sized char can be added to a carrier and suitable excipients for generating an aqueous-based ink.

Interestingly, the carbon utilized in these processes and in, for example, screen printing, is optimized when the carbon is particular shaped. Typical carbon materials are long and flat, and while they have a 3-dimensional characteristic, the length is typically 3 times to 1000 times of the width, and typically the length is 5 times to 10,000 times of the height. In comparison to the typical long and flat particles, the process herein creates particles that are more consistent in dimensions between the length, width, and height. This results in a particle that, while not having an organized shape, has a length in each of the three (3) axes (x, y, z) that is closer in size than the typical graphene particle. Thus, where a flat carbon (graphene) of the prior art would have a length of 5 microns, a width of 5 microns, and a height of 0.01 micron, for example, the claimed carbon would not have the same discrepancy with regard to differences between the longest and shortest axis. An example particle could have a length of 1.5 microns, a width of 1.0 microns, and a height of 0.1 microns. Herein, this carbon, having similar dimensions shall be referred to as a 3D carbon, referring to its relatively size in three dimensions.

FIGS. 4A-4D depict images of the 3D carbon and of graphene. Notably, the 3D carbon is of smaller size, is more consistent in the size in relation to the other particles, and is less flaky (i.e., the material is not as long and thin) as the prior art carbon. The hemp-based material thus has a narrower bell curve and the particles themselves are more consistent in their size ratio between the major axis (the longest length) and the minor axis (the shortest length) for each particle on average, as compared to the prior art.

Hemp based carbon materials are derived from hemp stalk and other hemp fibers. The hemp material is preferably utilized within a specific window after harvest to prevent the natural separation of the fiber from the hurd, which leads to the formation of sticky residues that impact the efficiency of postprocessing. This sticky resin material, once formed, reduces the ability to efficiently char the hemp, and further reduces the yield of milled char that is generated under 2 microns in size. Accordingly, after cutting the hemp stalks they are dried, preferably in a controlled manner, for example in a drying room or chamber, that evenly allows for drying and reduces retting and growth of mold or fungus. However, it may be suitable to cut the hemp and allow them to dry on the field for 0-7 days and/or collecting them and finalizing the drying process in a controlled environment.

Processing of the hemp may include one or more steps. In the simplest form, the hemp is simply collected, dried, and placed into a furnace for carbonization. In other steps, the hemp is ground to a smaller size to allow for more consistent and efficient charring of the material. Consistency of the material is important as the inks produced by the methods herein are optimized with small particles of hemp char that are generated in particular sizes within a bell curve. This small and precise size and distribution of particle sizes in the bell curve allows for the material, which is conductive when utilized with a proper carrier, forming a conductive ink.

Pyrolysis

When performing pyrolysis to make the hemp-based carbon of the present disclosure, bio-charring temperatures at preferably between about 1100° C. to about 1500° C. and can be performed via batch or continuous flow processes. Processed dried hemp is added to a furnace and then heated to more than 1100° C. and typically less than 1500° C. In particular, the heating process is done under low oxygen conditions to prevent the complete combustion of the material, as known to those of ordinary skill in the art. Accordingly, the chamber is filled with one or more inert gasses during the char process. While a temperature of at least 600° C. is sufficient to char the material, it leads to uneven burn of the material. More importantly, processing at the low end of the temperature scale leads to lower amounts of conductivity on its own. Furthermore, in subsequent processing of the material into micron particle sizes, the inconsistent char makes it impossible to effectively grind to a substantially homogeneous particle size, i.e. a narrow bell curve, with any reasonable yield. Therefore, a temperature above 1100° C. is preferred.

Accordingly, the process of charring and activating the hemp material is important for imparting certain physical properties to the material, specifically toward formation of inks that are conductive. Conductivity is optimized by charring at a temperature of above 1100° C. as detailed in Table 1.

TABLE 1

Comparison of materials for electrical properties

| Material | Temperature of Furnace (° C.) | Electrical Property |
|---|---|---|
| hemp | 600 | Weak |
| hemp | 900 | OK |
| hemp | 1100 | Good |
| hemp | 1200 | Good |
| Hemp | 1250 | Good |

In certain embodiments, it may be suitable to activate the char with steam activation or chemical activation in order to further modify the structure of the char when it is not initially charred at above 1100° C. These processes, including steam activation or chemical activation, and known to those of ordinary skill in the art. However, the use of these processes, while functional, reduce the sustainability of the ink.

The hemp-based carbon utilized in the inks of the present disclosure are made by a unique process. First, as defined in FIG. 1, the activation process is preferably charred, wherein the charring is carried out at greater than 1100° C. in low oxygen conditions. This temperature is different than the prior art, as most bio-charring (charcoal formation) is not carried out at such high temperatures. Indeed, most charring is performed at between 400° and 600° C. In addition to the difference in charring temperature, the physical characteristics of the hemp plant make the subsequent processing of the charred material exceedingly difficult at any suitable yield. Hemp, like any other cellulosic plant material, is simply a structured set of cells. However, charred hemp has a significantly lower density and weight than other common char materials making it more difficult to process into small particles of uniform size necessary for its use in the inks described herein. For example, Table 2 shows several common tree materials and their density, as compared to hemp.

TABLE 2

Density of certain materials

| Species | Density of Dry Wood (lb./ft$^3$) | Weight of Dry Cord (lb.) | Recoverable Heat Value of Cord (Millions of BTU) |
|---|---|---|---|
| Aspen | 27 | 2290 | 10.29 |
| Cherry | 36.7 | 3121 | 14 |
| Hickory | 50.9 | 4327 | 19.39 |
| Red Oak | 44.2 | 3757 | 16.8 |
| Hemp | 8.74 | 741 | 3.33 |

Process for Generating Substantially Homogeneous Particle Sizes of Hemp

While certain higher density and heavier cellulosic materials are easily carbonized and then also easily reduced to a uniform and appropriate particle size, this is not so with the hemp material. More specifically, to process carbonized hemp particle sizes of between 2 and 5 microns is extremely difficult. The low density of the material and the small size and consistency of the 2-5 micron carbon desired and necessary for creating suitable inks makes the milling and classification process extremely difficult. Several processes were tried that resulted in varying levels of success with regard to consistency and also to yield, including hand milling, high energy ball milling, air jet grinding and others. Importantly, use of a classification system was determined to be necessary to properly sort the hemp-based carbon based on the desired size.

In preferred embodiments, the process utilizes a wide range of hemp materials including: full hemp stalks, chopped full hemp stalks, chipped full hemp stalk, full hurd, chopped hurd, chipped hurd, ground hurd, separated hurd and fiber, chopped separated hurd and fiber, chipped separated hurd and fiber, ground separated hurd and ground separated fiber. However, preferably, the hemp is either primarily hurd material, or a combination of both hemp hurd and hemp fibers. In certain applications, the combination of the hurd and fibers provides a superior material for conductivity.

Interestingly, we tried several different carriers including aqueous based and sustainable ink carriers as well as non-sustainable carriers. Plastisol is a nonsustainable carrier base and it can be mixed with the hemp carbon but is not conductive. Several different aqueous bases were tested, each comprising an aqueous vehicle, at least one solid pigment such as $TiO_2$, or another base pigment. Many of the carriers contain a surfactant, a pH modifying agent, a cosolvent such as a monoalkyl ether of 1-4 carbon alkyl glycols, and other excipients necessary to bind the carbon, allow the ink to flow, and otherwise serve to stabilize the ink for printing.

Accordingly, the carrier is preferable an aqueous based carrier, such as MagnaPrint® Aquaflex V2 Neutral, which is an opaque base that can be utilized as a carrier for the addition of a portion of carbonized hemp. There are a number of other commercially available aqueous based clear or opaque bases that can be utilized as the carrier.

In certain embodiments, additional excipients and volatile materials may be added to the carrier to improve the quality of the ink. For example, it may be suitable to add acids, bases, buffering agents, or salts to the carrier, as well as certain flowing agents, or bulking agents in order to optimize the flow of the ink, optimize the viscosity of the ink, alter the drying speed and modify the adherence of the ink to a material, or modify other properties of the ink. For example, different alcohols may be added, which are more volatile than the primary water carrier. Otherwise, a flowing agent, a bulking agent and the like are added to the carrier to make the final ink product. However, a particular concern is that while certain components may be utilized successfully in forming an ink, they defeat the purpose of generating a sustainable, ecofriendly water-based ink. Therefore, preferably, the ink comprises a portion of carbonized hemp, specifically the 3D carbon, and an aqueous carrier.

Inks produced in this manner are "green" as they are formed from natural materials and are themselves biodegradable. This is advantageous when the inks are added to biodegradable papers or materials themselves. Furthermore, through selective addition of excipients, the ink is fully edible, and thus can be used for printing or writing in locations that need to be food safe.

In certain embodiments, the 3D carbon material is sold as a pigment, which can be added to a predetermined set of carriers and admixed in a secondary location to form an ink. For example, the product may be a predetermined amount of 3D carbon alone or admixed with one or more additional components to yield a dry product. A third party can then take the dry product and add it to one or more predetermined carriers to yield the ink of choice at the concentrations desired for the final product. A kit would include instructions, suggested formulations and concentrations, and recommendations for excipients of choice that the end user might want to incorporate. Thus, a user could formulate nonconductive inks or conductive inks as desired.

Therefore, a preferred embodiment comprises a base carrier and carbon, with predetermined amounts of each. The materials are then added based on a 1-6% by weight of carbon for nonconductive inks, and 14-19% by weight of carbon for conductive inks when printed. By separating the carbon from the base carrier, the shelf life of the material can be greatly improved, and the individual user can then determine the precise quantity of carbon to add based on the particular use and need.

Milling

Figure 3:
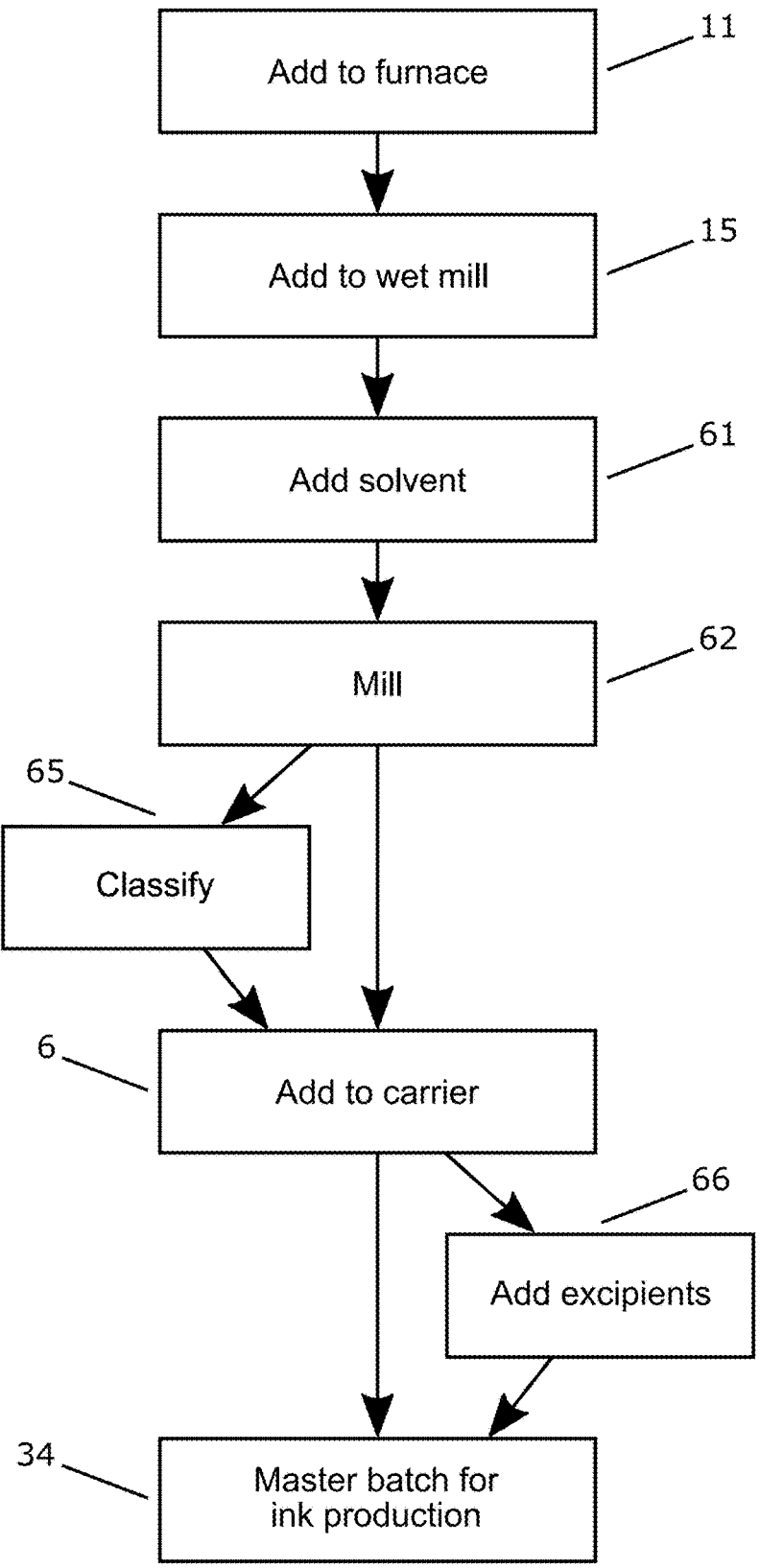
FIG. 3 depicts a wet milling process for milling hemp and forming an ink.
Figure 4B:
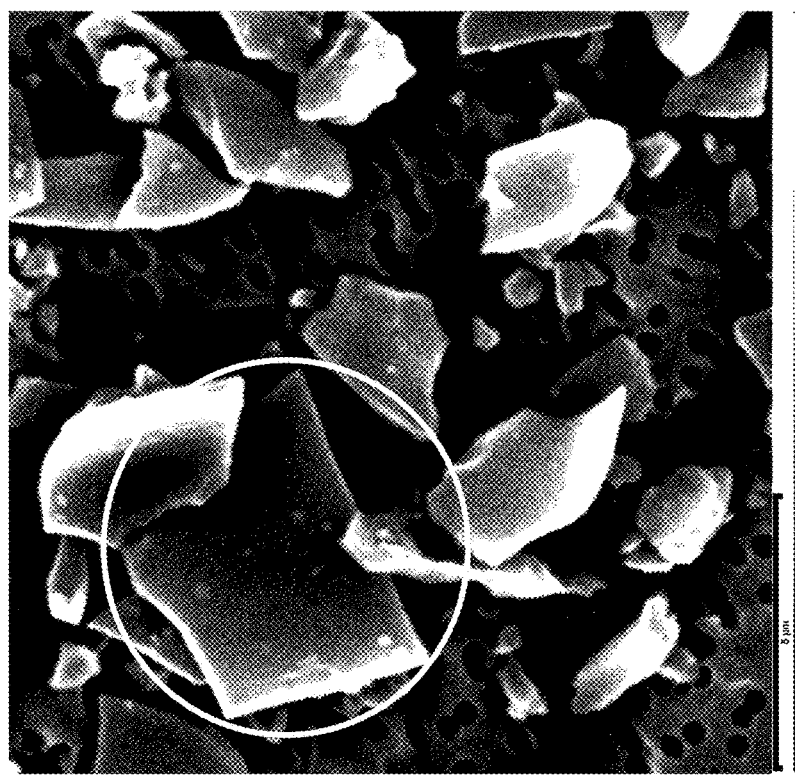
FIGS. 4A and 4B depict images of carbon made in a shape for most effective ink.
Figure 4A:
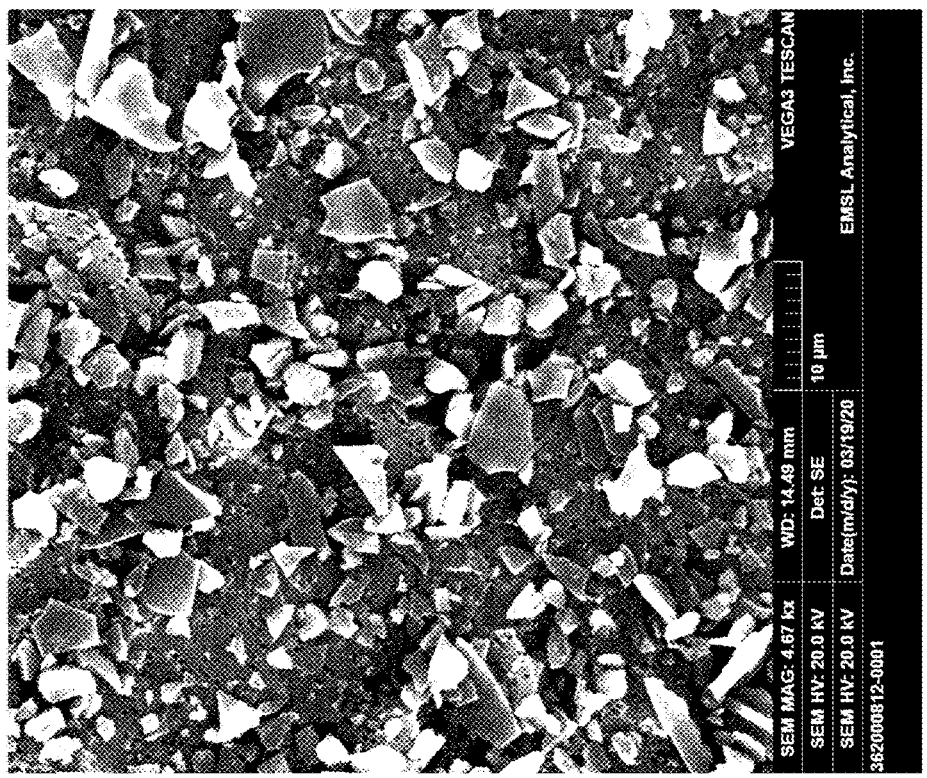
Figure 4D:
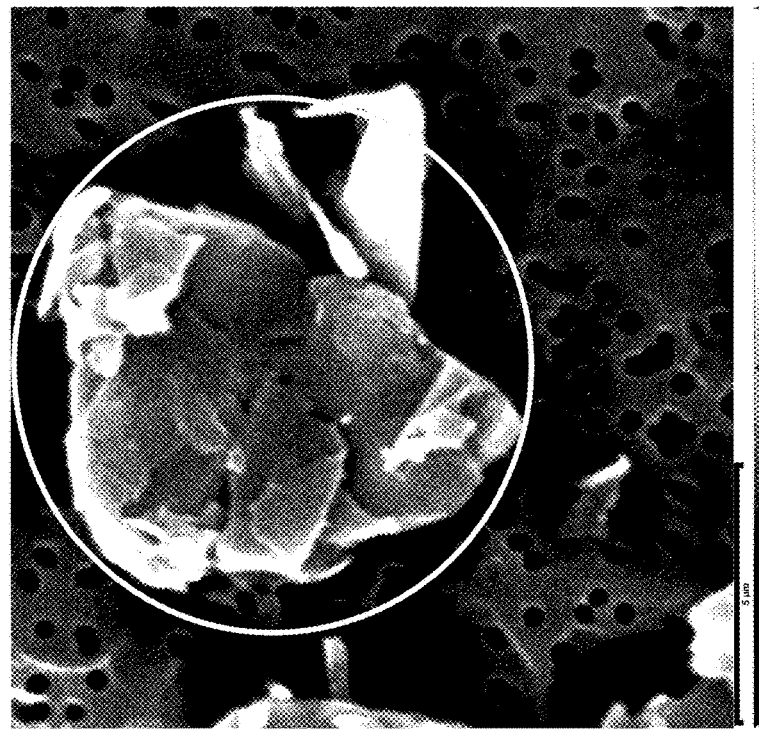
FIGS. 4C and 4D depict images of "flat carbon" particles found in prior art.
Figure 4C:
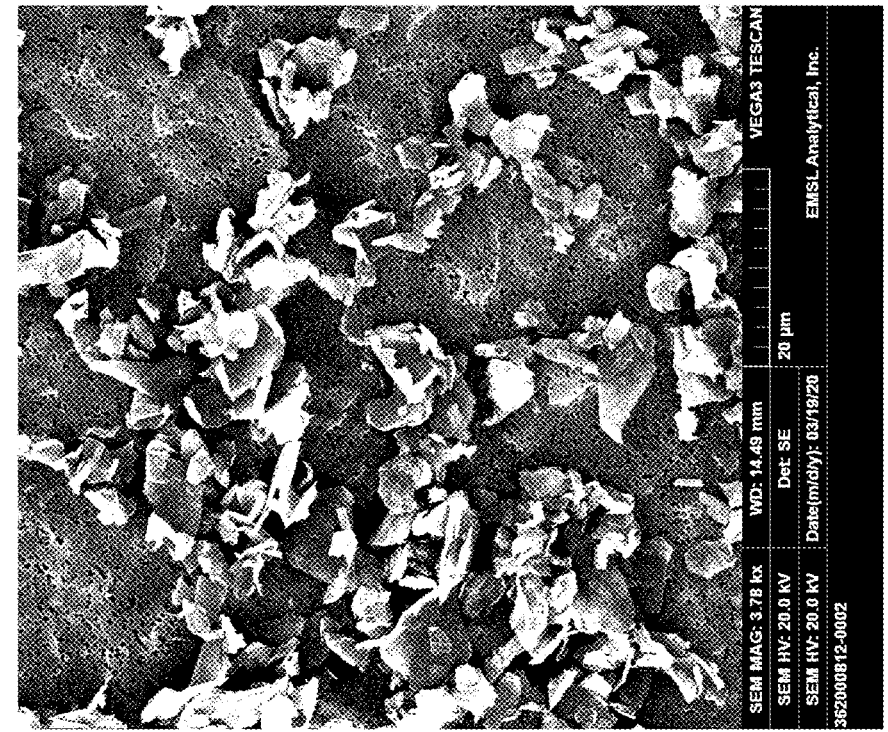

Because of the brittle nature of the carbonized material after it has been charred at 1100° C. or greater, it can be directly milled (15) into fine powders having particle sizes in the micron dimensions for suitable use as a particle in an ink in a mechanical dry or wet milling process. For example, the wet milling process of FIGS. 1 and 3 takes the char and adds it to a shaker with steel balls. In FIG. 3, the hemp is added to a furnace 11, added to a wet mill 15, a solvent is added 61, the material is milled 62, the material is optionally classified 65, and then added to a carrier 6, wherein excipients 66, maybe optionally added to form the master batch of material for ink production 34. In wet milling, a portion of liquid (or a solvent) is added to the shaker, and it is vibrated at between 1 and 100 Hz for a period of between 1 min and 24 hours, with between 3 to 30 Hz the most preferred range. FIG. 1 describes this process as well, with optional dry milling steps. Each of the wet or dry milling will result in rapid reduction of particle size into a particle powder of substantially uniform particle size yielding the 3D carbon.

Milling or grinding of the material to a specific classification size creates a better product with greater uses than products that do not have a specific classification size. In certain embodiments, the distribution of particle sizes within a range may also be defined by an arithmetic mean, arithmetic mode, etc. As used herein, the term "specific classification size" refers to a percentage of particles within a certain given point as compared to the classification size. For example, a specific classification size of 2-5 microns, means that a set amount of all particles is between 2 and 5 microns. For example, 50% of all particles. More preferably, a 90%, 95% specific classification size, a 99%, or a greater than 99% specific classification size means that 90%, 95%, 99%, or more than 99% of particles are between 2 and 5 microns in size.

Furthermore, the specific classification size can be further narrowed by defining a specific micron size and bell curve. For example, a 99% specific classification size of 2-5 microns and a 95% 3.5-micron bell curve means that 95% of all particles are within 2 standard deviations from 3.5 microns. The bell curve may be a 50%, 75%, 90%, 95%, 99%, or more than 99% bell curve. In essence, a tighter bell curve gives a batch of particles wherein the particle size is more homogeneous in size than a broader bell curve. Having something be more homogeneous leads to a better resulting product. In a preferred embodiment, the particles have a 90% specific classification size of between 2 and 5 microns, with a 90% bell curve at 2.5, 2.75, 3, 3.25, 3.5, 4.0. 4.5 and 5.0 microns.

Figure 2:
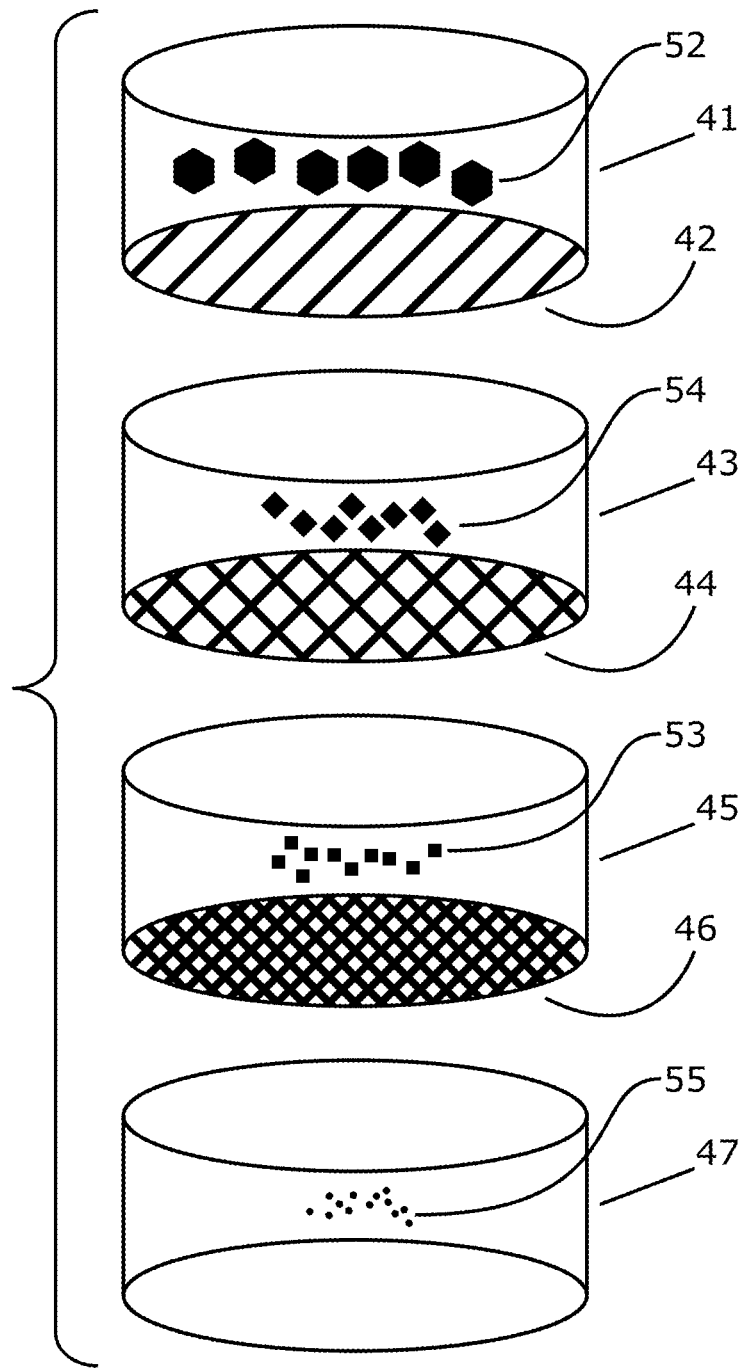
FIG. 2 depicts a classification system.

The classification process, e.g. as defined in FIGS. 1 and 2, proved especially difficult to generate a material of less between 2 and 5 microns at a suitable yield. To form a material with 90% of particles smaller than 5 microns, with the average mean particle size between 2-5 microns, a screening or classification process is utilized to remove particles greater than 5 microns after the material is milled and allow for particles of less than 3 micron. For example, as detailed in FIG. 1, the charred hemp is captured (21), added to a ball mill (or another mechanical mill) (31). For wet processing, a solvent is added to the mill (32), and the material is classified (16). Alternatively, additional excipients (33) can be added before milling or after milling before classifying the material (16). In certain embodiments, the materials are added directly to a master batch for ink production (34), while in other embodiments, the material is captured in desired fractions (17), i.e. through a classification process, a certain size particle is captured over another size particle. Desired size materials are maintained and rejected fractions 18 or sized materials are readded to the ball mill (31) to be remilled.

When dry milling is utilized, the material is added to the ball mill 31, and the material is milled in a mechanical mill and then either additional excipients are added 72, or the material is directly placed 73 into a master batch, or the material is added to a classification step 16. Thus, when processing, the material can be milled in a wet medium or a dry medium. In either case, the user may choose to classify the material or to add it to an ink batch for processing.

Finally, in classifying, the particles are sorted by size. This is a classification process (16), as defined in FIG. 1. An example of a classification sieve set is defined by FIG. 2, a first classification container (41), with a first classification screen (42), a second classification container (43), and a second classification screen (44), a third classification container (45), and a third classification screen (46), and finally a fourth container (47), that captures any material that falls through the third classification screen (46).

As an example, the first classification screen (42) is 10 microns, the second classification screen (44) is 5 microns, and the third classification screen (46) is 2 microns. By adding the charred and milled hemp to the first container (41), any material greater than 10 microns will be captured in the first container (41). This allows material smaller than 10 microns and larger than 5 microns to be captured in the second container (43). Material smaller than 5 microns and larger than 2 microns is captured in the third container (45), and finally, the material smaller than 2 microns passes through the third classification screen (46) and into the fourth container (47). Other classification processes are known to those of ordinary skill in the art.

In preferred embodiments, the preferred particle size is between 1 and 5 microns, and more preferably between 2 and 5. The specific range can be determined by the classification process. Creation of particles at this size is optimized for creating inks that are easily printed, e.g. through nozzle or screen printing and possess the necessary properties for color fastness and conductivity.

In order to move to commercial applications, use of grinders may include air jet grinders, wet processors, small batch high energy ball grinders, dry agitated media mills, and pressure grinding. However, the grinding is mechanical, in order to create a 3D carbon. The grinding process included times from about 1 hour to about 24 hours, with all times in between.

It is not sufficient to use a process that creates flat, or sheet like carbon, as these materials result in inferior products and inks. Indeed, when a sample was printed using graphene (a flat, flaky carbon) in the same carrier as the carbon of the present disclosure, the graphene material was more difficult to work with, in that it clogged the finer mesh printing screens, it was harder to mix for printing, and upon printing, it was not a deep black color, but instead had iridescent properties. Accordingly, for printing of a black material, and for ease of use, the flat carbon proved inferior and was also not a sustainable component of the ink.

For an ink that is intended to transmit electrical signals, it is preferred to use the material within a carrier that does not increase the resistance of the char to maintain or enhance electrical properties. Factors that improve electrical conductivity include particle size, structure, and porosity. Small particle size lends to higher electrical conductivity. Where the particles are small and relatively uniform in shape, their surface area is larger than otherwise and allows for greater contact between particles to generate or store charges. High structure means that the carbon agglomerates to form long and branched chains. Such a structure is ideal for conductive compounds. Higher particle porosity enables better electrical conductivity, and this is generated through increased temperature processing, (i.e. above 1100° C.).

Testing of Printed Ink

In order to test the ink, a number of samples were created with variations of the quantity of carbon and then tested against varying screen sizes, for screen printing onto a cotton material. The method printing and the size of the printing mesh changes how much material flows onto a print surface and this impacts the crocking results as well as conductivity.

Crocking refers to the rubbing off of color due to abrasion, measured by the amount of staining on a bleached cotton square. The same is true for wet crocking which uses a wet bleached cotton square. Using the AATCC gray scale for staining, each sample is rated on a scale of 1-5, 1 being much color transfer and 5 being no transfer. Samples containing 1%, 3%, 5%, 10%, 15% and 20% Hemp Black carbon by weight were printed on tee shirts using various screen sizes. The smaller the number of the screen, i.e. 60, the fewer and larger the holes in the mesh. The inverse is true for the larger numbers, such as 156.

Inks were created using MagnaColours® Aquaflex V2 Range Neutral as the base with a portion of carbon ranging from 1, 3, 5, 10, 14, 15, 19 and 20% of hemp-based carbon made by the processes as described herein to generate micron sized carbon. However, other aqueous based carriers, having solids within the carrier and, optionally utilizing a dispersant, a surfactant, solids, and binders, which are soluble in the aqueous carrier are also suitable.

As detailed in FIGS. 5 and 6, the vertical axis refers to a scale of color transfer, with 1 transferring a lot of color and 5 being no color transfer. Accordingly, a higher number means that the ink performed better than a lower number. The tests on the samples showed that the lower carbon percentages, 1% and 3%, have a consistent superior fastness to crocking across all screen sizes whether for wet or dry crocking. As the percentage of carbon by weight increases, the colorfastness diminishes and becomes more inconsistent. The lower percentages perform better because the base is not overloaded with carbon that it cannot hold, decreasing the amount of loose particles on the surface of the substrate that will rub/wash off. The larger screen sizes improve the colorfastness of the sample due to the smaller holes preventing any carbon not suspended in the aqueous base to pass through onto the substrate. At 20% carbon, the material is too loaded and thus the ink does not adhere well. Thus, an upper limit of concentration is preferred at 19% carbon.

FIG. 6 details results for wet crocking. In wet crocking, 1% carbon by weight has a consistent superior fastness to crocking across all screen sizes. All samples resulted in lower performance during wet crocking compared to dry due to the usage of a water base. The same carbon percentage and screen size conclusions made from dry crocking are applicable for wet crocking.

The conductivity test determined the amount of carbon necessary for conductivity, its response to washing, and also impacts of screen size. The samples were printed with two passes on different screen sizes and tested with a multimeter to confirm or deny conductivity. Samples that were conductive were washed in cold water using a high efficiency washing machine and powdered detergent without optic brighteners. After each wash, samples were measured for conductivity using the same multimeter with a pass being confirmed at 500 ohm resistance.

Figure 7A:
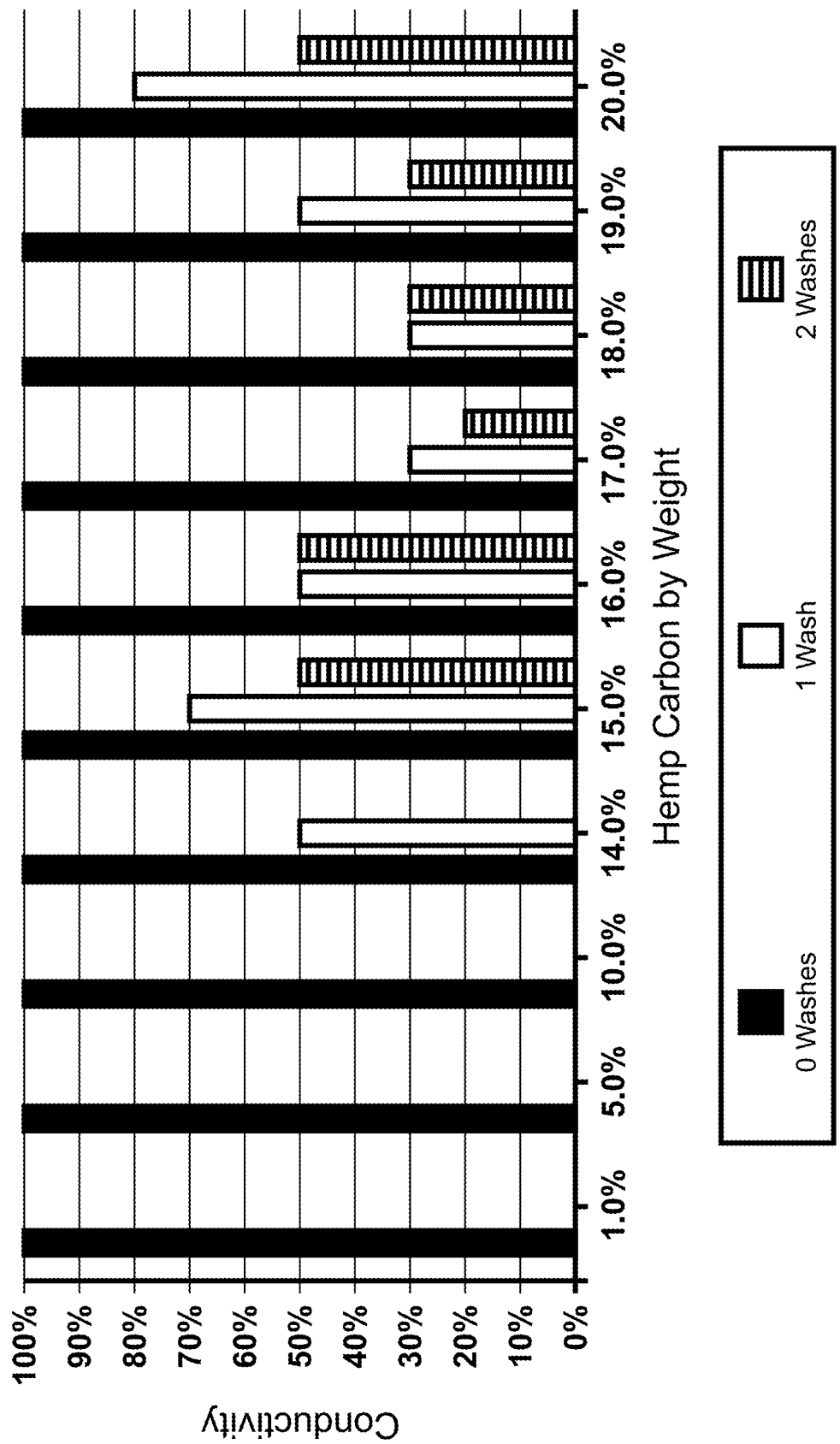
FIG. 7A depicts data regarding hemp carbon ink conductivity at various percentages of carbon by weight.
Figure 7B:
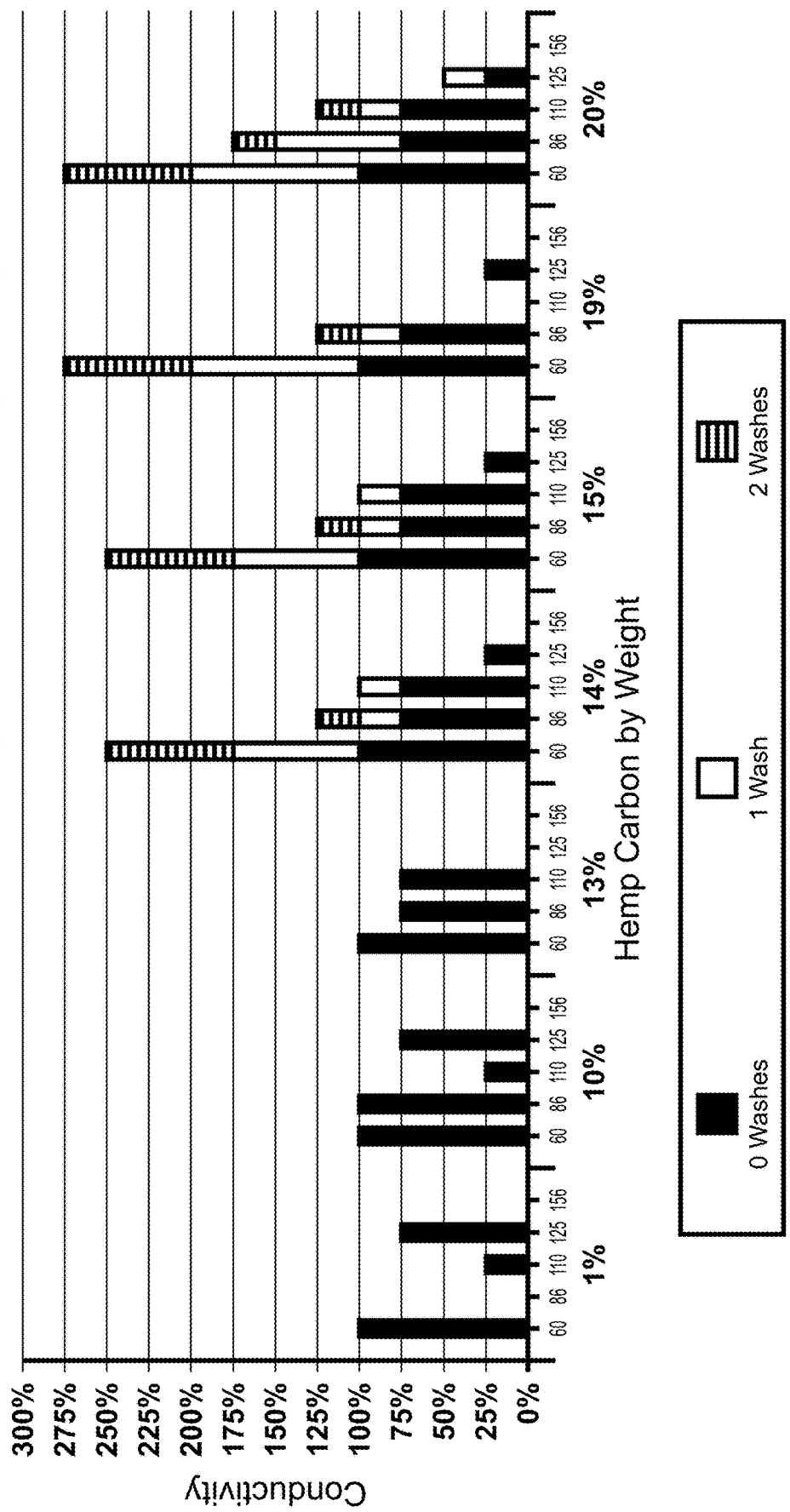
FIG. 7B depicts data regarding hemp carbon ink conductivity at various screen sizes and percentages of carbon by weight.

FIGS. 7A and 7B depict the result of conductivity testing. For the samples in FIG. 7A, ink was printed on screen size of 60 with two passes of ink from 1% to 20% carbon (several of the data points are omitted). Each sample was then tested for conductivity before washing, with one wash and with two washes. Interestingly, at 1% and screen size 60, the material is unexpectedly conductive. However, upon washing, no sample was conductive until 14%, when approximately 50% of the samples were conductive. At 15% carbon by weight, was the first time that a second wash retained conductivity. Interestingly, the values and conductivity regressed slightly at 17-19 percent.

FIG. 7B details printing using screen sizes 60, 86, 110, 125, and 156. On each screen size, each formula was printed using 1, 2 and 3 passes. A total of 1200 samples were created with 240 for each of the screen sizes 60, 86, 110, 125, and 156 and an initial pass through samples was performed to determine the quantity of samples that were conductive. All 1,200 samples were checked for conductivity using a multimeter, wherein the sample was "conductive" if the multimeter reads below 500 ohms. Interestingly, printing with screen size of 156 reveals that the ink is not conductive under any of the different weight percentages. It is believed that at the 156 screen size, the holes are so small, that the carbon gets stuck and does not pass through, thus the ink is not conductive, because there is a lack of carbon on the surface. Samples for 14-20% are shown stacked with additional washes. So for the screen size 60, 100% were conductive, 75% conductive after 1 wash, and an additional 75% after 2 washes. This data is continued over the remaining data points.

Washing greatly impacts conductivity and after one wash, at all screen sizes, conductivity is impacted. For the washing tests, each of the tests were washed in high efficiency washing machines on cool cycle. At one wash, nearly all samples printed with screen size 60 were still conductive, while all samples printed at 125 screen size were no longer conductive, and x amount of the samples at 86 and 110 screen size were conductive. Accordingly, where the material needs to be washed, only samples at 60, 86, and 110 screen size can be utilized. After a second and third wash, only the 60 and 86 screen size remained conductive and after 4 washes, only the screen size 60 remained conductive at more than four washes. Accordingly, conductivity is sensitive to the washing mechanism and that if any washing is going to be performed and retain the conductivity, screen sizes of 60 or 86 are highly preferred.

Figure 8B:
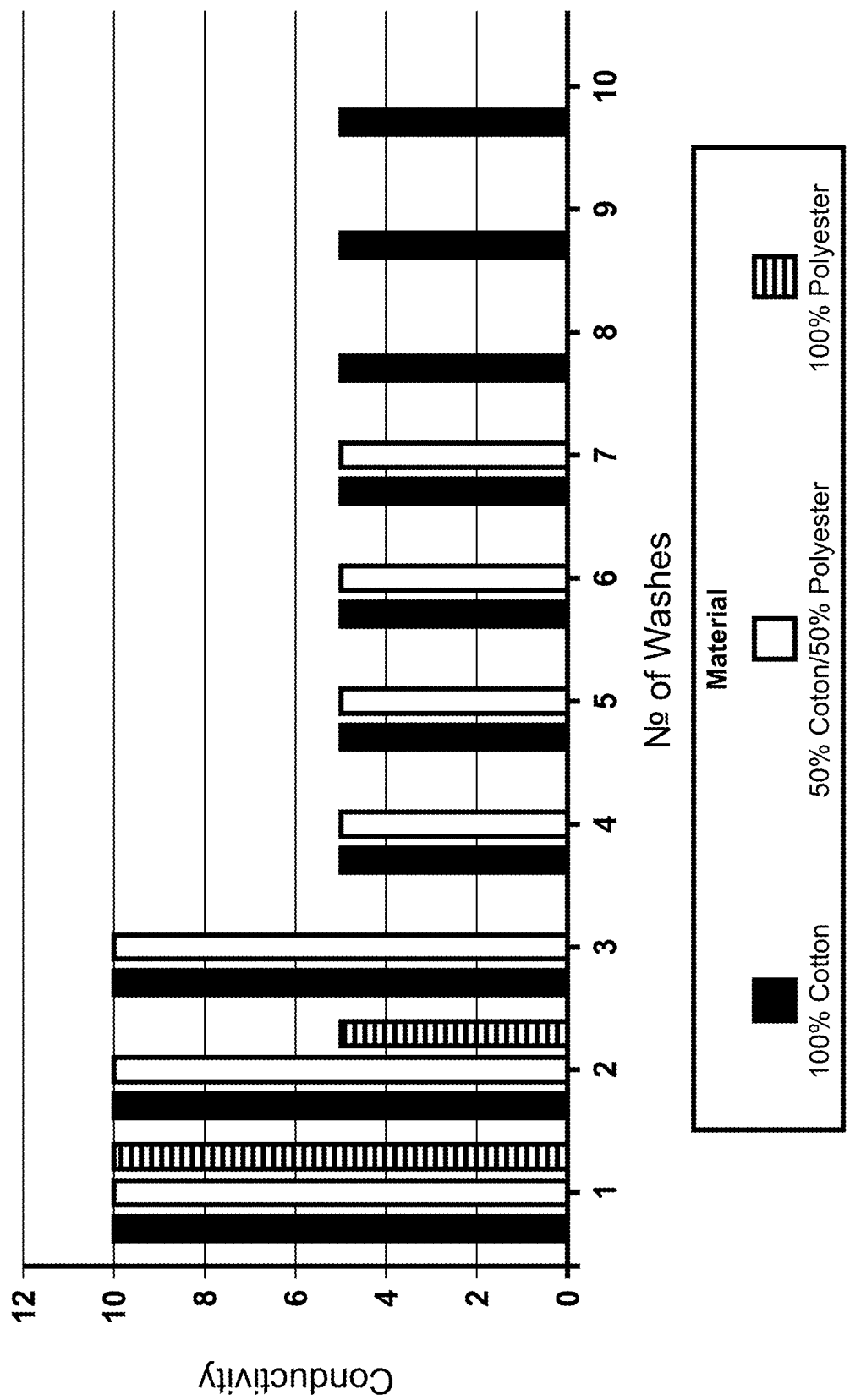

FIGS. 8A and 8B depict conductivity on the cotton, polyester, and blended materials. After initial testing of concentrations of ink on a sample, 15% and 20% Hemp Black carbon formulas were printed on 3 different substrates; 100% cotton, 100% polyester and 50% cotton 50% polyester to confirm the prior results. All samples were printed with 110 screen size onto the different fabrics and checked for conductivity using a multimeter. Samples that were conductive were washed in cold water using a high efficiency washing machine and powdered detergent without optic brighteners. After each wash, samples were measured for conductivity using the same multimeter.

FIG. 8B tested the upper limit of the samples, namely with 20% carbon. It is evident from the data that 20% carbon does not perform as well as the 15% carbon. Evidence shows that there is simply too much carbon. This is in line with the earlier tests which showed that 19% carbon was the upper limit for the ink material.

The studies also show that 100% cotton substrate held conductive properties longer than 50/50 and 100% polyester. This is because cotton is more absorbent and holds onto the ink better during the wash and dry cycles. In nearly all samples the 15% carbon had longer lasting conductivity. This is possibly due to there being less lost carbon that the base cannot suspend, making it a more evenly dispersed solution. A more evenly dispersed solution will have the carbon particles touching more consistently, allowing for stronger conductivity. Indeed, the cotton allows for superior absorption of the ink thus locking in the material, as opposed to sitting on top of the fibers with synthetic polyester material. In certain applications, a dispersing agent can be advantageously added to improve the dispersion of the hemp. A dispersing agent is a dispersant polymer capable of functionalizing the pigment to stabilize the dispersion in the ink. For example a polyester, a methacrylate, or polyethylene oxides.

Therefore, where the material does not need to be washed, conductivity can be generated at very low concentrations of carbon, if and only if a screen size 60 (or smaller) is used. Notably, conductivity at 1%, 2, 3-10 was generated at screen size 60, and conductivity only appeared for other screen sizes at about 12%, with 100% of prints being conductive at 14%.

Furthermore, printing from 14% to 20% yielded conductive materials under most screen sizes. However, 20% carbon appears to be at or beyond the upper limit of the ink. At the 20% concentration, several problems occurred, namely, the carbon percentage impacted the screen at all sizes, making repeated use less reliable due to clogging or other issues. Furthermore, when washing the 20%, the conductivity fully washes out. When reviewing the 20% carbon, it is clear that the quantity of carbon has reached a "saturation" point in the carrier, and that it is difficult to mix and be supported by the carrier at 20%, and thus yields a material that easily washes off, and prints inconsistently. This did not occur at the 19% concentration. Accordingly, when printing with a screen size of 86 or 110, which are standard screen sizes, printing a concentration of between 14 and 19% carbon surprisingly functions the best to maintain conductivity, and also for overall function of the ink.

However, if a screen size of 60 can be utilized, it was even more surprising to find that lower concentrations of carbon were suitable. Thus, for single use materials, if conductivity is desired, a lower concentration of the material can be utilized to generate conductive printing, even as low as 1%. However, the ink was most effective for conductivity when used at, at least 8% carbon, even with screen size of 60 and the ink is most effective for conductivity when used between 14 and 19% by weight of carbon.

The data confirms that that smaller screen sizes (a smaller screen size, i.e. 60 being "smaller" than 156, means that there are fewer holes in the screen, and thus the pores in the screen are larger for size 60 than for 156) allow for more conductivity. This result is caused by the larger holes in the mesh allowing for more carbon to be loaded in one concentrated area, unlike the smaller holes of the larger screen sizes that allow for less particles to pass through onto the substrate. However, this has the inverse effect on crocking.

UV Protection

The materials were tested for their ability to block UV rays. UPF stands for ultraviolet protection factor and measures the sun protection of fabrics. A UPF of 50 blocks $^{49}/_{50}$ (98%) of UV rays when worn. UVA rays penetrate the skin deeper, causing long term damage such as skin cancer and wrinkles and comprises 95% of the solar radiation that reaches Earth's surface. UVB rays have a short wavelength and are responsible for immediate sunburn.

Figure 9A:
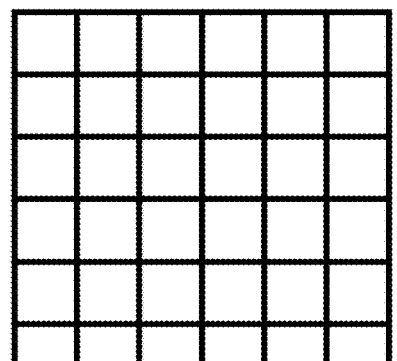
FIGS. 9A-9C depict samples for UV testing of ink.
Figure 9B:
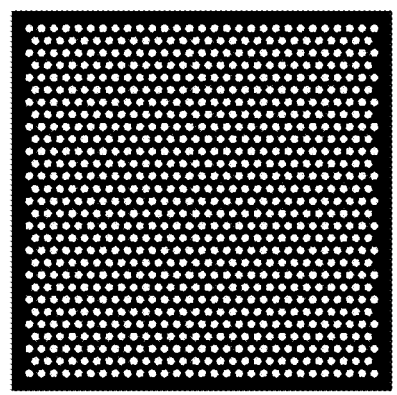
Figure 9C:
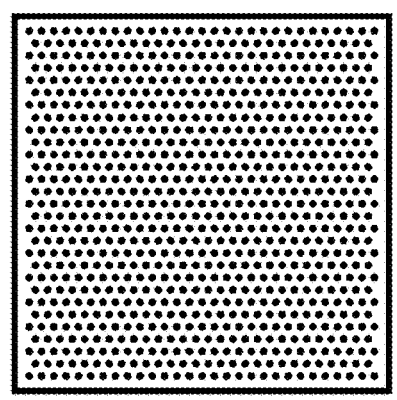

As depicted in FIGS. 9A, 9B, and 9C, several sample designs were tested for their UV performance, namely, a grid 9A, a mesh 9B (printing the background black and leaving white (open) dots), and an inverse mesh 9C (printing black dots on a white background).

Using the hemp based carbon in a water base blocks high amounts of UV rays when printed on a fabric. The more passes used during printing, the more coverage there is on the substrate, leading to more protection. When printed in various patterns, UV rays are still blocked across the entire surface. The most effective patterns utilize more ink, printed closer together as detailed in Table 3.

TABLE 3

Ultraviolet Protection Factor

| Formula | % Carbon | Rating | Result UVA % | Result UVB % |
| --- | --- | --- | --- | --- |
| Grid Print | 5% | 20 | 97.25 | 66.26 |
| 1 Pass | 6% | 20 | 93.85 | 96.15 |
| 3 Pass | 6% | 50+ | 97.44 | 98.33 |
| Mesh | 6% | 50+ | 99.65 | 99.61 |
| Inverse Mesh | 6% | 30 | 97.87 | 97.28 |

The hemp based carbon was also tested against other known pigments and with other carriers in order to compare the materials. The data and observations are depicted in Table 4. Notably, the Eco6™ (hemp-based material of the present disclosure) produces a superior printing at ordinary concentrations of the pigment, it is sustainable, and does not require an additive to print. Furthermore, the material when used at appropriate concentrations and screen size retains conductivity and also adheres well to the printed surface.

not conductive, it is hard to clean and mix and thus is unusable as an ink material. The coconut water-based ink did not mix well, after it was printed, it yielded a shiny and iridescent finish and did not print well. This material also required a further additive to enable it to effectively print. The carbon black material specifically required the use of

TABLE 4

| Sample | Particle Size | Particle Shape | Mixability | Visuals | Printability | Sustainability | Additives Needed to Print | Conductive |
|---|---|---|---|---|---|---|---|---|
| Eco6 ™ Water-Based Ink | 1-5 nm | Round | Easy to mix | Blue-gray, when not printed | Easy to print, prints very black | Nontoxic bio-based pigment and plastisol free solvent | NO | YES |
| Eco ™ Plastisol-Based Ink | 1-5 nm | Round | Hard to mix, hard to clean | Tar-like, very black | Hard to print | Nontoxic bio-based pigment | NO | NO |
| Coconut Water-Based Ink | Undefined | Round | Does not mix well | Shiny and iridescent, coarse | Does not print well | Nontoxic bio-based pigment and plastisol free solvent | YES | NO |
| Carbon Black Water-Based Ink | Undefined | Round | Easy to mix | Finer, very black | Does not print well without additives or thinners (thicker) | Uses fossil fuels and PVC to produce pigment | YES | NO |
| Graphene Water-Based Ink | 5 nm | Flat | Easy to mix at lower percentages (i.e. 5%) | Iridescent, soft black | Easy to print at lower percentages (i.e. 5%) | Uses fossil fuels and PVC to produce pigment | NO | YES |

In Table 4, the Eco6™ material was utilized according to the processes as described in this application. In Sample 1, the Eco6™ was admixed with a water-based solvent. In Sample 2, plastisol was used as the solvent. In Sample 3, a prior art coconut-based water ink was utilized. In Sample 4, a carbon black water-based ink was utilized. In Sample 5, graphene was utilized in a water-based ink.

Table 4 included several parameters including:

PARTICLE SHAPE: A round particle shape will disperse more evenly than a flat particle.

MIXABILITY: The viscosity of the aqueous solution is affected by how well the pigment is dispersed. If a pigment clumps within the solution, it will result in an uneven printed color or potentially inhibit the quality of the print.

VISUAL: When producing a true black ink, any iridescence or coagulation will affect the color and quality of application.

PRINTABILITY: Particles, if not small enough or dispersed evenly, can get stuck in the screen, causing spots in future prints, and creating textures. This unevenness can also affect how well the print dry's and can result in the end product being tacky.

SUSTAINABILITY: Sustainable bio-based pigments such as Eco6™ do not contain PVC and are free from toxins that are found in carbon blacks. Water based solvents are safe for water ways and are easier to clean than plastisol-based solvents. The need to add any additional solvents such as thinners and viscosity agents, while it may improve quality, reduce sustainability. The ideal combination for a sustainable ink is one that uses bio-based pigments and a water base that results in an ink which requires no additional additives in order to perform.

Notably, each of the Samples 2, 3, 4, and 5 fail certain aspects that are important for a performance ink that is sustainable. For example, the plastisol is hard to print, it is additives to print effectively and it also requires the use of fossil fuels and PVC to produce the pigment, and thus it is not ecofriendly. Finally, the graphene-based ink is a flat particle carbon, and while it was useful at lower quantities, the material requires fossil fuels and PVC to prepare the pigment.

Therefore, the hemp-based carbon is a superior pigment that possesses unique properties when utilized in an aqueous carrier. The smaller the particle size, the easier it is for the pigment to be dispersed in the aqueous solution and the more even the color will be. A smaller particle size also contributes to an improved colorfastness.

The hemp carbon described herein was tested against commercially available carbon black (a petroleum derivative) for contents of PAH. The hemp carbon showed a 10% reduction in detected PAH as compared to carbon black. Furthermore, 33% of the PAH that were detected were less than the reporting limits. This made the hemp derived carbon to be much lower in total PAH as compared to the petroleum-based materials.

Therefor the hemp-based carbon serves as a unite particle for admixing into aqueous ink carriers. Specifically, the ink may be formulated for conductivity. The ability for a conductive ink allows for potential wireless smart textiles and applications within the military and medical field. Indeed, the uses of the inks are unlimited. For applications where the material is single use, disposable, and where it may be covered by another layer of material (such that crocking is not an issue), the ink may be conductive at concentrations as low as 1% by weight. To ensure performance, conductive ink is recommended to be in concentrations of at least 8% when using a screen size of 60, and for larger screen sizes, i.e. 86 or 110 or larger, then concentrations of 14-19% are preferred.

In other embodiments, the hemp black serves as a pigment. Where typical black pigment is warranted, the hemp carbon can be utilized at low concentrations and yields a safe and effective pigment, specifically at concentrations of 1% to 6% by weight percent in an aqueous carrier. This material at those concentrations is easy to use, provides excellent color, and is retained on a variety of materials.

Those of skill in the art will recognize that the hemp-based carbon of the present disclosure and the inks created thereto are incorporated into an ink carrier with the optional inclusion of one or more additional excipients. Those of ordinary skill in the art can formulate the final ink product to meet their specific needs including single use printing, washable printing, conductive inks, and combinations of the same. However, use of the hemp-based ink provides an ecofriendly printing option that was heretofore unobtainable.

What is claimed is:

1. A sustainable ink comprising an aqueous carrier and a nonpetroleum-based carbon pigment made from hemp char; said hemp char produced by charring hemp at at least 1100° C. under nitrogen gas for a period of at least 60 minutes; and wherein said hemp char is milled to yield a milled char; wherein the milled char is classified using a classification system to yield a fraction of classified char between 2 and 5 microns in size; wherein the classified char is added to the carrier at between 1% and 20% of the total weight of the ink.

2. The sustainable ink of claim 1 wherein the ink is conductive when printed with a 60 screen size and at a concentration of at least 1 weight percent.

3. The ink of claim 1 wherein the ink is suitable for screen printing with a size 60 screen, and wherein the classified char comprises between 1 and 6 weight percent of the weight of the ink, which yields a nonwashable conductive ink.

4. The ink of claim 1 wherein the classified char comprises between 14 and 19 weight percent of the weight of the ink, and wherein the ink is washable upon screen printing with a screen size of between 86 and 110 and remains conductive after washing.

* * * * *